United States Patent [19]
Hyon et al.

[11] Patent Number: 4,663,358
[45] Date of Patent: May 5, 1987

[54] POROUS AND TRANSPARENT POLY(VINYL ALCOHOL) GEL AND METHOD OF MANUFACTURING THE SAME

[75] Inventors: Suong-Hyu Hyon; Yoshito Ikada, both of Tamatsukurimotomachi, Japan

[73] Assignee: Biomaterials Universe, Inc., Osaka, Japan

[21] Appl. No.: 855,929

[22] Filed: Apr. 25, 1986

[30] Foreign Application Priority Data

May 1, 1985 [JP] Japan .................................. 60-94091

[51] Int. Cl.$^4$ .............................................. C08J 9/28
[52] U.S. Cl. ........................................ 521/64; 521/61; 521/66; 521/82; 521/88; 521/89; 521/141
[58] Field of Search ...................... 521/61, 64, 66, 141

[56] References Cited

U.S. PATENT DOCUMENTS

| | | | |
|---|---|---|---|
| 3,318,856 | 5/1967 | Derup | 521/141 |
| 3,481,888 | 12/1969 | Sinclair | 521/141 |
| 3,492,250 | 1/1970 | Derup | 521/141 |

*Primary Examiner*—Morton Foelak
*Attorney, Agent, or Firm*—Antonelli, Terry & Wands

[57] ABSTRACT

A porous and transparent hydrated gel is prepared from a poly(vinyl alcohol) solution in a mixed solvent consisting of water and an water-miscible organic solvent. Upon cooling the poly(vinyl alcohol) solution below room temperature, a gel is formed as a consequence of crystallization of poly(vinyl alcohol) molecules. Exchange of the organic solvent included in the gel with water produces a hydrated gel of poly(vinyl alcohol) which has a high tensile strength, a high water content, and a high light transmittance.

6 Claims, 5 Drawing Figures

POROUS AND TRANSPARENT POLY(VINYL ALCOHOL) GEL AND METHOD OF MANUFACTURING THE SAME

BACKGROUND OF THE INVENTION

The present invention relates to a transparent gel and a method of manufacturing the same gel. More particularly, the invention is concerned with a porous poly(vinyl alcohol) gel of high mechanical strengths, high water contents, and excellent transparency, and with a method of producing the gel.

A hydrogel is defined as the gel which contains water but is not soluble in water. Such hydrogels have been well-known for a long time, but it is just recently that the hydrogel has attracted much attention because of its novel properties. Current applications of the hydrogel include biomaterials such as soft contact lens and matrix for drug sustained release, matrix for immobilizing enzymes and microorganisms, a covering medium for maintenance of low temperatures, matrix for perfume release and so on.

The starting polymers for the gel formation involve gelatin, carrageenan, alginic acid, poly (2-hydroxyethyl methacrylate), carboxylated methylstarch, hydrolyzate of acrylonitrile-grafted starch, polyacrylamide, poly(acrylic acid) salt, hydrolyzate of vinyl acetatemethyl acrylate copolymer, polyoxyethylene, poly(vinyl pyrrolidone), polystyrene sulfonate, poly(vinyl alcohol) and so on.

It is a well-known fact that the viscosity of highly concentrated aqueous solutions of poly(vinyl alcohol) (hereinafter referred to as PVA) increase with time and the solutions finally set to a gel when allowed to stand at room temperature. The resultant gel is, however, sticky and low in mechanical strength.

A variety of methods have been reported to enhance the poor mechanical strength of the hydrated PVA gel. Among them are chemical crosslinking of PVA with aldehydes such as formaldehyde and glutaraldehyde, PVA crosslinking by irradiation with radiations such as gamma rays, electron beams, and ultraviolet light, PVA crosslinking through coordinate bonding with metal ions such as Ti, Cu, and Co, and PVA crosslinking with the use of boric acid, borax, and Congo Red. However, these proposed methods are not successful in obtaining the hydrated PVA gel which has both the high mechanical strength and the high water content. In other words, an increase in mechanical strength results in low water content, whereas a high water content leads to poor mechanical properties of the PVA gel.

In order to improve the mechanical properties of the gel without using any additives, but keeping the water content high, it was proposed to defreeze at room temperature within a short time period the highly concentrated aqueous PVA solution which had been frozen below the freezing point in a short time period (Japanese Unexamined Patent Publication (Tokkyo Kokai) No. 52296/1975). The PVA gel obtained by this method is not, however, satisfactory in the mechanical strength and becomes largely swollen upon immersion in plenty of water.

For gel formation another method was proposed, in which a frozen aqueous solution of PVA was subjected to partial freeze-drying under vacuum without defreezing (Japanese Unexamined Patent Publication (Tokkyo Kokai) No. 130543/1982). More in detail, this preparation method consists of casting a concentrated aqueous solution of PVA with a degree of saponification of not less than 95% by mole and a viscosity-average degree of polymerization of not less than 1,500 into a mold, subsequent freezing the solution at temperatures lower than $-6°$ C., and partial freeze-drying the frozen mixture under vacuum without defreezing. This method has a disadvantage in that it needs the vacuum freeze-drying process.

Also, a new method of preparing a PVA gel of high mechanical strengths was reported in Journal of Chemical Society Japan (Nippon Kagaku Kaishi), No. 9, p.1254, 1983. The gel was prepared in this method by repetition of freezing and defreezing of a concentrated aqueous PVA solution. The resulting PVA hydrogel had high elasticity, similar to the gel obtained by freezing and subsequent partial freeze-drying under vacuum.

All of these gels with high elasticity and high water contents are not colored but opaque and translucent.

SUMMARY OF THE INVENTION

According to the present invention there is provide a porous PVA hydrogel which has tensile strengths of not less than 10 kg/cm$^2$, water contents of 50 to 98% by weight, and visible light transmittances of not less than 80%. The porous PVA hydrogel can be prepared by dissolving PVA in a mixed solvent consisting of water and an organic solvent, followed by crystallization of PVA at temperatures lower than room temperature.

DETAILED DESCRIPTION

Figure 1:
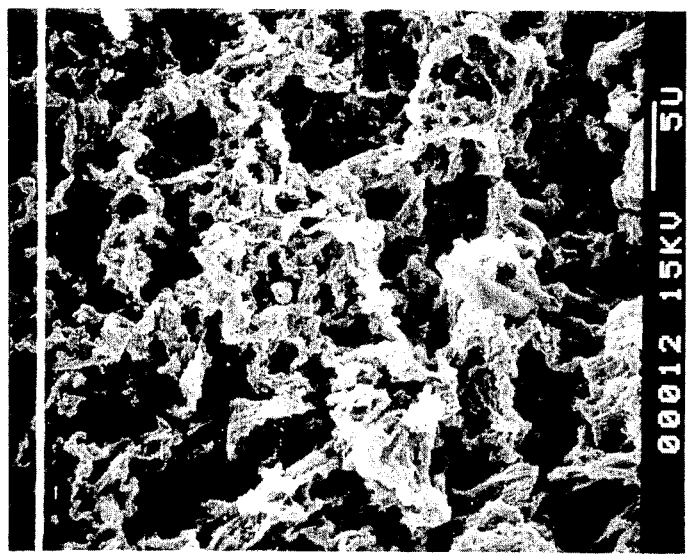
FIGS. 1 to 5 are the scanning electron microphotos for the gel surface observed at 3,000 times magnification for Samples A to E described in Table 3, respectively.

The degree of saponification of PVA to be used in this invention should be not less than 95% by mole, preferably 97% by mole and most preferably not less than 99% by mole. If PVA has a degree of saponification, for instance, lower than 85% by mole, the gels obtained from the PVA exhibit no high mechanical strength. The viscosity-average degree of polymerization of PVA to be used in this method should be not less than 1,000, preferably 1,700. The commercially available PVA with degrees of polymerization ranging from 1,700 to 2,500 is recommended, as the gel strength becomes lower with the decreasing degree of polymerization. If a gel of higher strengths, higher water contents or higher resistance against hot water is desired, it is recommended to use PVA with high degrees of polymerization ranging from 3,000 to 10,000 or PVA rich in syndiotactic or isotactic structure.

The organic solvents to be mixed with water in this invention should be compatible with water, preferably miscible with water at any mixing ratio. The recommended organic solvents include acetone, methyl alcohol, ethyl alcohol, n-propyl alcohol, iso-propyl alcohol, aminoethyl alcohol, phenol, tetrahydrofuran, dimethyl formamide, glycerine, ethylene glycol, propylene glycol, triethylene glycol, and dimethyl sulfoxide. Of these organic solvents, dimethyl sulfoxide is the most preferable because of its high solubility for PVA and a desirable dependence of the freezing point depression on the mixing ratio of water to dimethyl sulfoxide. As the mixing ratio of water to these organic solvents largely governs the mechanical strength as well as the transparency of the resulting gel, the mixing ratio should be carefully chosen according to the application purpose of the gel. In general, the water:organic solvent ratio ranges from 90:10 to 10:90 by weight, preferably from 70:30 to 10:90 by weight. A gel can be produced even from a 100% dimethyl sulfoxide solution of PVA, but becomes translucent after exchange of dimethyl sulfoxide with water, although the gel before solvent exchange is transparent.

In order to carry out the method of manfacturing a transparent gel in accordance with the invention, a PVA solution is first prepared at a PVA concentration from 2 to 50% by weight. The concentration is determined according to the required water content and mechanical properties of the gel. Such highly concentrated solutions can be readily prepared by raising the temperature of the mixture from PVA and the solvent by the use of autoclave or high-frequency heater.

Following casting the completely dissolved solution of PVA into a mold or a container, the solution is allowed to stand at temperatures lower than room temperature. During this process the PVA molecules undergo crystallization, resulting in formation of a network gel. The lower the temperature, the shorter the time period required for complete crystallization is and the smaller the size of crystallites is. As a result, a more transparent gel is formed under deeper cooling. It is recommended to cool the solution in a freezer kept at temperatures of not more than $-10°$ C., preferably at about $-20°$ C. When the maximal PVA crystallization is attained, the gel is immersed for a long time in water under flowing to remove the organic solvent. Thorough exchange of the organic solvent in the gel with water finally yields a PVA hydrogel. The hydrogel can be also obtained by drying the gel to completion for removal of the solvent after the maximal crystallization of PVA, followed by immersing the dried gel in water for hydration. In this case, the gel drying can be carried out simply in the open atmosphere, but would be completed in a shorter time period if vacuum drying is employed. Sometimes, this process of exchange of solvents is not needed. For instance, when the gel of the present invention is to be used as the matrix for slow release of drugs of perfumes, the presence of organic solvent in the gel might not interfere with the release.

When the PVA hydrogel is prepared through the drying process, an slight increase of crystallinity of PVA will accompany the drying, leading to enhancement of its mechanical properties and light transparency. Raise in temperature during drying will result in an increase of crystallinity as well. However, as the water content of gel decreases with the increasing crystallinity, several times repetitions of drying and water immersion may be required in certain cases.

Moreover, irradiation of the gel with ionizing radiations under a reduced pressure, in an inert gas such as nitrogen and argon, or in deairated water can be carried out in order to sterilize the gel or to improve the mechanical properties, the thermal resistance, and the dimensional stability.

The transparent and strong hydrogel of this invention can be molded into any shape by casting the starting PVA solution in a desired mold to provide films, rods, blocks, tapes, tubes, fibers, and products of more complicated shape. Therefore, the gel can be used as biomedical materials such as soft contact lens, intraocular lens, catherter, membranes for ultrafiltration, materials for biotechnology such as matrix for enzyme and fungi immobilization, and industrial material like filaments and hollow fibers.

A plausible mechanism for formation of such a transparent gel with high water contents and high mechanical strengths is explained as follows. The solution obtained by dissolving PVA in the mixed solvent consisting of water and an organic solvent is likely to be molecularly homogenous. As the temperature of the homogeneous solution is lowered, the molecular motion must become restricted to some extent. Upon cooling below room temperature, the intermolecular interaction of PVA chains, probably leading to hydrogen bond formation may be promoted to yield small crystalline nuclei. The longer the solution is allowed to stand under cooling, the more the PVA crystallization may proceed further. The resulting crystallites should act as cross-links, which produce a three-dimensional network structure. Most of the water molecules must be present in the interspace among the PVA crystallites. As a consequence, a hydrogel of high mechanical strengths and high water contents if formed without the help of any chemical cross-linking agent.

The reason of the gel to be transparent although porous, may be explained as follows. If a PVA hydrogel is prepared starting from an aqueous solution containing no organic solvent as other methods employ for gel preparation, the aqueous solution is frozen usually below $-5°$ C. to induce phase separation into an ice phase and a polymer phase. A large volume change may be take place during this phase separation. This leads to formation of a porous gel with a pore size of not less than 5 μm as scanning electron microscopic observation reveals. As a result, a significant different in light refractive index appears to make the gel translucent. On the contrary, the mixed solvent consisting of water and an organic solvent employed in this invention prevents the PVA solution from freezing even at temperatures lower than 0° C. and hence the PVA crystallization takes place without accompanying a significant volume expansion change. Consequently, the resulting porous gel carries pores of small size, which result in an insignificant difference in refractive index and, therefore, in formation of a transparent gel. In fact, the pore size determined by scanning electron microscopy is not more than 3 μm and homogeneously distributed so far as the gel is transparent. The PVA hydrogel obtained from 100% dimethyl sulfoxide solution showed porous structure with pore sizes larger than 5 μm. The translucency of this gel can be explained in terms of the large pore size which resulted from a large volume change occuring upon freezing at about $+5°$ C.

The present invention is more specifically described and explained by means of the following Examples. It is to be understood that the present invention is not limited to the Examples and various changes and modifications may be made in the invention without departing from the spirit and scope thereof.

EXAMPLE 1

To a powdered PVA with the degree of saponification of 99.5% by mole and the viscosity-average degree of polymerization of 1,700 the mixed solvents described in Table 1 were added so as to have such PVA concentrations as described in Table 1. Homogeneous PVA solutions were obtained upon heating the mixture for 2 hrs in an autoclave kept at 110° C. Following cooling the PVA solutions to 50° to 80° C., they were cast on glass plates and allowed to stand for achieving the PVA crystallization under the conditions described in Table 1. Various PVA hydrogel sheets of 1 mm thickness were prepared by this procedure and their tensile strength, water content, and visible light transmittance were determined according to the following measurement conditions. The results are summarized in Table 2.

[Tensile strength]

The tensile strength of gels of dumbbell shape was measured at a tensile speed of 100 mm/min, 20° C., and relative humidity (RH) of 65%.

[Water content]

The gels with Code Nos. 1-18 and Comparative Example Nos. 4 and 6 in Table 1 were immersed in water at 20° C. for 3 days and then air-dried overnight. Following drying the gels further under vacuum overnight at room temperature to remove the organic solvent remaining in the gels, they were again put in plenty of water for hydration at 37° C. for 2 days. The water content of the hydrated PVA gels was calculated from the equation:

$$\text{Water content} = \frac{\text{Weight of hydrated gel} - \text{Weight of dried gel}}{\text{Weight of hydrated gel}} \times 100\ (\%)$$

For comparison, the water content of gels of Comparative Example Nos. 1-3 in Table 1 was also determined after the same procedures as described above, although they contained no organic solvent.

[Visible light transmittance]

Transmittance of light at 550 nm for the gels of 0.5 mm thickness was measured under immersion in water at 25° C.

In Table 1, DMSO, EtOH, EG and GL are following compounds.
DMSO: Dimethyl sulfoxide, EtOH: Ethyl alcohol,
EG: Ethylene glycol, GL: Glycerine

TABLE 1

| Ex. No. | Mixed Solvent Composition | Mixing Ratio (by weight) | PVA Concentration (% by weight) | Crystallization Condition |
|---|---|---|---|---|
| 1 | H$_2$O + DMSO$^a$ | 75:25 | 10 | for 3 hrs at −20° C. |
| 2 | " | 60:40 | " | for 3 hrs at −20° C. |
| 3 | " | 50:50 | " | for 3 hrs at −20° C. |
| 4 | " | 15:85 | " | for 3 hrs at −20° C. |
| 5 | H$_2$O + EtOH$^b$ | 85:15 | " | for 3 hrs at −20° C. |
| 6 | " | 75:25 | " | for 3 hrs at −20° C. |
| 7 | " | 50:50 | " | for 3 hrs at −20° C. |
| 8 | H$_2$O + EG$^c$ | 85:15 | " | for 3 hrs at −20° C. |
| 9 | " | 75:25 | " | for 3 hrs at −20° C. |
| 10 | " | 50:50 | " | for 3 hrs at −20° C. |
| 11 | " | 15:85 | " | for 3 hrs at −20° C. |
| 12 | H$_2$O + GL$^d$ | 85:15 | " | for 3 hrs at −20° C. |
| 13 | " | 75:25 | " | for 3 hrs at −20° C. |
| 14 | " | 50:50 | " | for 3 hrs at −20° C. |
| 15 | " | 15:85 | " | for 3 hrs at −20° C. |
| 16 | H$_2$O + DMSO | 50:50 | 15 | for 3 hrs at −20° C. |
| 17 | " | " | 20 | for 3 hrs at −20° C. |
| 18 | " | " | 25 | for 3 hrs at −20° C. |

| Com. Ex. No. | Single Solvent | PVA Concentration (% by weight) | Gel Preparation Condition |
|---|---|---|---|
| 1 | H$_2$O | 15 | Defreezing for 10 hrs at 5° C. following freezing for 5 hrs at −20° C. |
| 2 | " | 15 | Partial freeze-drying under vacuum following freezing for 5 hrs at −20° C. |
| 3 | " | 15 | 3 times repetition of freezing for 5 hrs at −20° C. and defreezing at room temperature |
| 4 | DMSO | 15 | Freezing for 3 hrs at −20° C. |
| 5 | EG | 15 | Freezing for 3 hrs at −20° C. |

TABLE 2

| Ex. No. | Tensile Strength (kg/cm$^2$) | Water Content (% by weight) | Visible Light Transmittance (%) |
|---|---|---|---|
| 1 | 15 | 92 | 81 |
| 2 | 18 | 90 | 87 |
| 3 | 20 | 89 | 99 |
| 4 | 23 | 85 | 98 |
| 5 | 11 | 95 | 82 |
| 6 | 16 | 92 | 87 |
| 7 | 21 | 88 | 85 |
| 8 | 13 | 91 | 81 |
| 9 | 19 | 83 | 86 |
| 10 | 19 | 85 | 88 |
| 11 | 20 | 87 | 84 |
| 12 | 10 | 92 | 83 |
| 13 | 15 | 94 | 85 |
| 14 | 14 | 87 | 82 |
| 15 | 17 | 84 | 80 |
| 16 | 32 | 71 | 99 |
| 17 | 38 | 63 | 99 |
| 18 | 56 | 55 | 99 |
| Comparative Example No. | | | |
| 1 | 23 | 75 | 68 |
| 2 | 31 | 69 | 51 |
| 3 | 28 | 71 | 54 |
| 4 | 15 | 82 | 61 |
| 5 | 11 | 87 | 57 |

EXAMPLE 2

Figure 2:
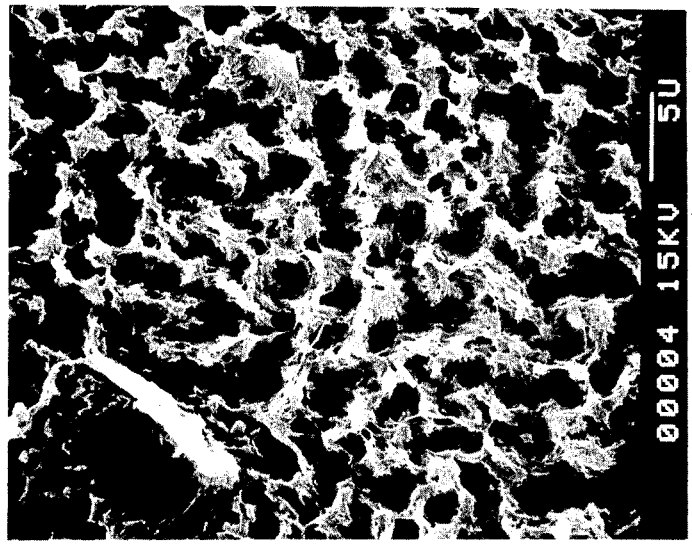
Figure 4:
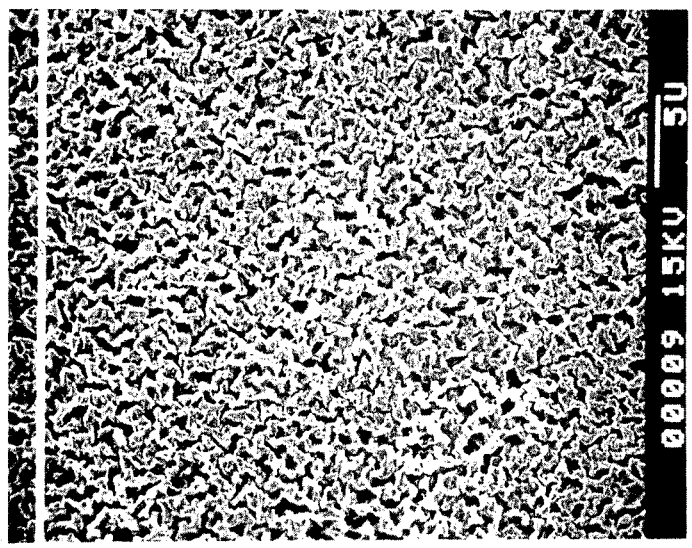
Figure 3:
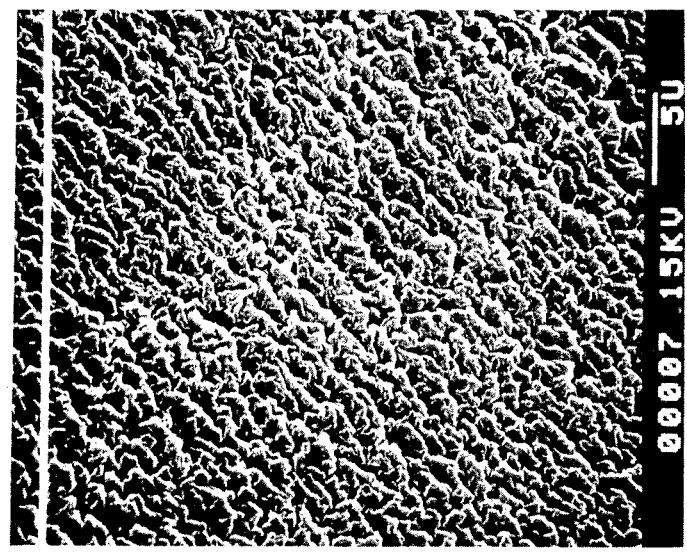
Figure 5:
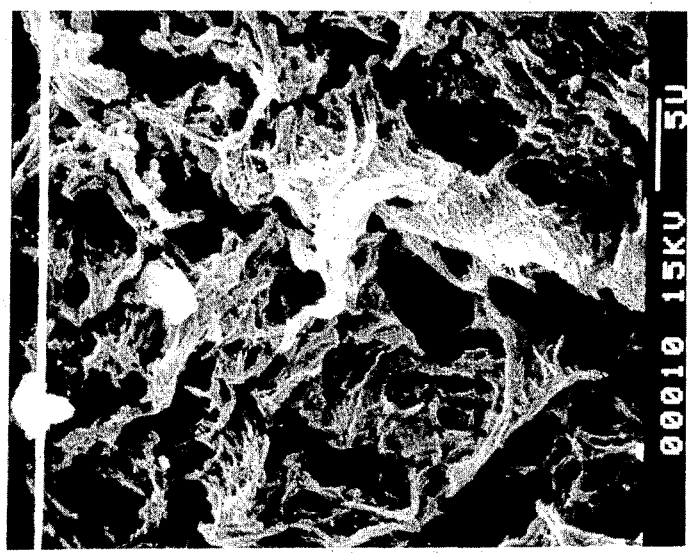

PVA solutions were prepared by the same procedure as described in Example 1, except that the PVA concentration was always kept at 12% by weight, the solvents of various mixing ratios described in Table 3 being used. After cooling the solutions for 3 hrs at −20° C. for the PVA crystallization, the hydrated PVA gels were prepared according to the subsequent procedures described in Example 1. The gel surface was observed by scanning electron microscopy at a magnification of 3,000 times after critical-point drying of the hydrated gels. The scanning electron microphotos of Samples A to E shown in FIGS. 1 to 5, respectively.

As is obvious from FIGS. 1 to 5, many irregular pores having sizes larger than 3 μm can be observed for the gels prepared from single solvents like Sample A (from 100% water) and Sample E (from 100% dimethyl sulfoxide), whereas the gels prepared from the mixed solvents have long and narrow pores of about 1 μm size, distributed densely and homogeneously (Samples B, C and D).

TABLE 3

| Sample | Mixed Solvent | Mixing Ratio (by weight) |
| --- | --- | --- |
| A | $H_2O$ + $DMSO^a$ | 100:0 |
| B | " | 80:20 |
| C | " | 50:50 |
| D | " | 20:80 |
| E | " | 0:100 |

As demonstrated above, the hydrated PVA gels prepared by the method of this invention exhibit high tensile strengths, high water contents, and, besides, strikingly excellent transparency. Therefore, these gels have a variety of applications, not only in the field for the conventional opaque gels, but also in the field where a transparent gel is required. Moreover, there gels are applicable to the field of biomedical materials and food industry, as they can be manufactured at a low cost without using any chemical crosslinker and catalyst which possibly exert an adverse effect to living body. The microporous structure of the gel gives a possibility of application as membrane for ultrafiltration and matrix for enzyme immobilization.

What we claim is:

1. A method of manufacturing a porous and transparent hydrated gel of poly(vinyl alcohol) comprising the steps:
   (a) forming a solution of poly(vinyl alcohol) having a degree of saponification of not less than 95% by mole, in a mixed solvent from water and an organic solvent,
   (b) cooling the solution below 0° C. for crystallization of poly(vinyl alcohol),
   (c) exchanging the organic solvent included in the gel with water to yield the hydrated gel.

2. The method of claim 1, wherein the organic solvents are missible with-water.

3. The method of claim 1, wherein the mixing ratio of water to the organic solvent is in the range of 90:10 to 90:10 by weight.

4. The method of claim 1, wherein the concentration of poly(vinyl alcohol) in the solution is in the range of 2 to 50% by weight.

5. The method of claim 1, wherein the organic solvents are dimethyl sulfoxide, glycerine, ethylene glycol, propylene glycol, triethylene glycol, dimethylformamide, methyl alcohol, ethyl alcohol, acetone, tetrahydrofuran, aminoethyl alcohol, phenol, n-propyl alcohol, iso-propyl alcohol.

6. The method of claim 1, wherein the solution obtained in step (a) is cooled in a container kept at temperatures of not more than −10° C.

* * * * *